July 15, 1958  F. C. MILLER  2,843,225
MOTOR AND BRAKE MECHANISM
Filed Sept. 11, 1953  3 Sheets-Sheet 1
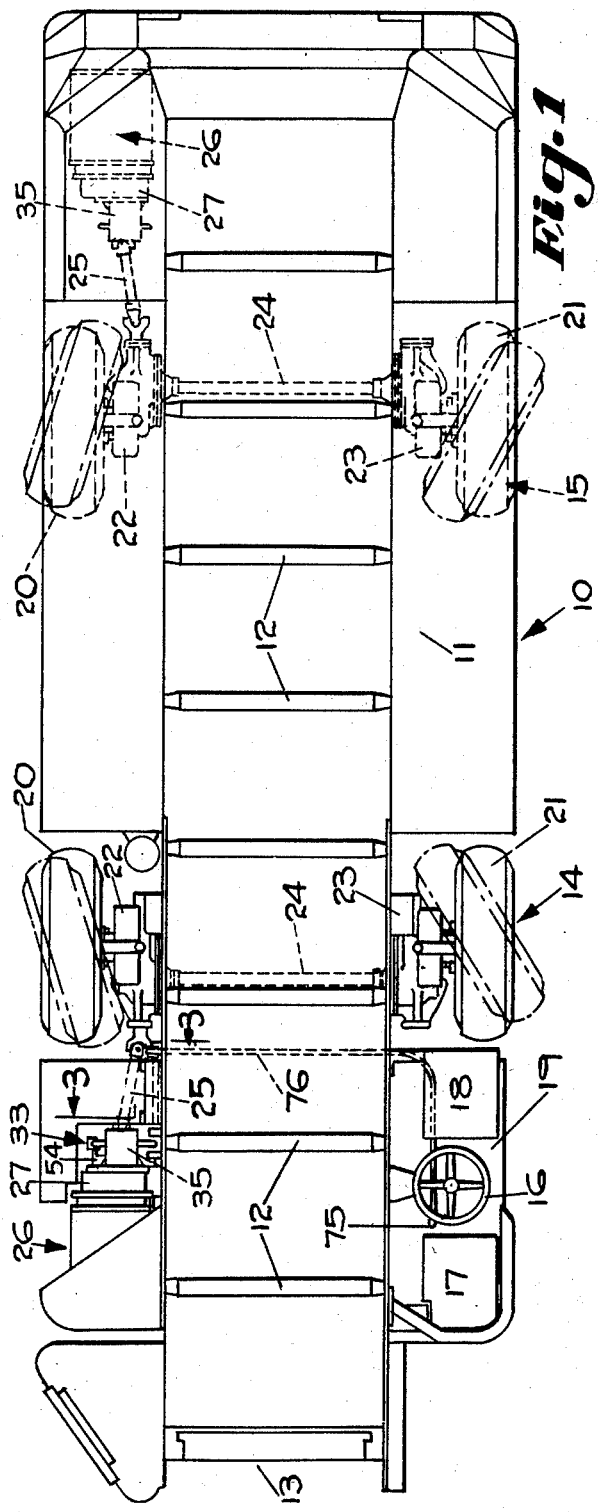
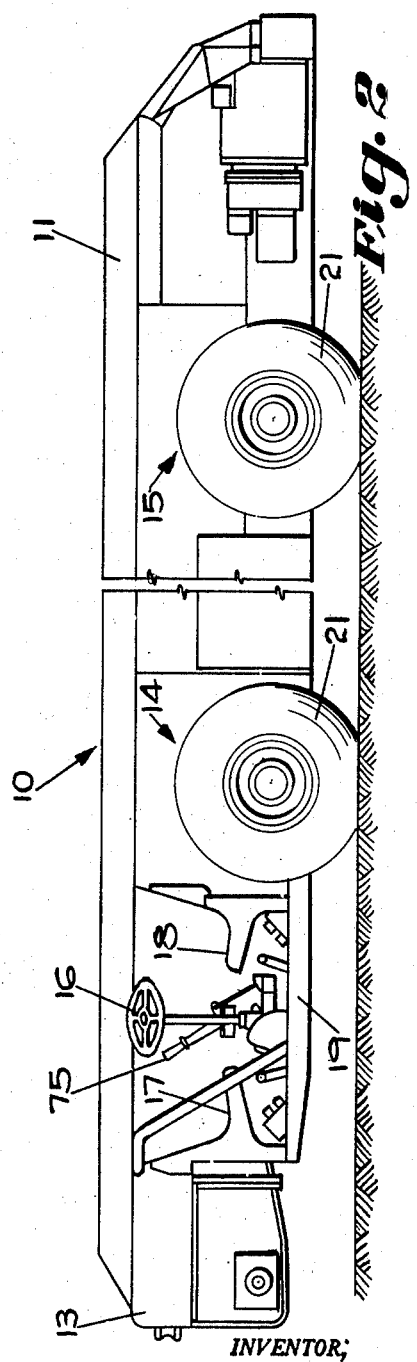
INVENTOR;
FRANK C. MILLER,
BY
ATT'Y

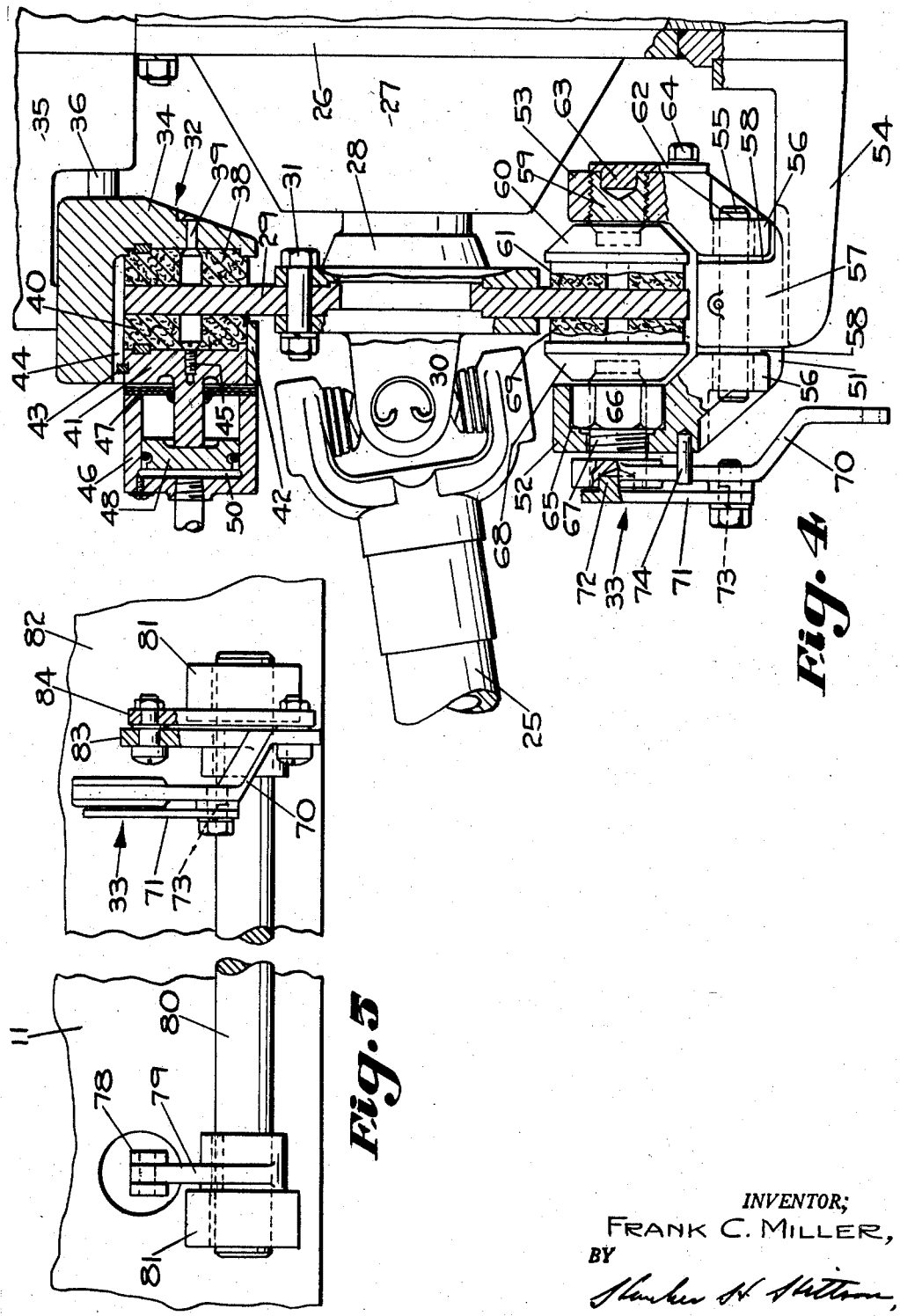

United States Patent Office 2,843,225
Patented July 15, 1958

2,843,225

MOTOR AND BRAKE MECHANISM

Frank C. Miller, Columbus, Ohio, assignor to The Jeffrey Manufacturing Company, a corporation of Ohio Application September 11, 1953, Serial No. 379,675

6 Claims. (Cl. 188—73)

In one aspect, this invention relates to a combination motor and brake unit wherein there is an element, the rotary motion of which may be arrested and/or prevented by brake means carried by the motor of the unit.

In another aspect, the invention relates to an improved structure which may be employed with facility as a parking or holding brake for preventing rotary movement of an element, such as a brake disc associated with a motor, a vehicle, or other machine normally provided with such a brake element.

One object of the invention is to provide an improved mechanically operated brake structure, particularly adapted to be employed as a holding or parking brake for a self-propelled vehicle, for example.

Another object of the invention is to provide an improved mechanically operated brake structure wherein cam means, or the equivalent, is employed for applying braking pressure to the friction elements of the brake mechanism, thereby permitting the brake mechanism to be operated easily manually.

Other objects of the invention will appear hereinafter, the novel features and combinations being set forth in the appended claims.

In the accompanying drawings:

Fig. 1 is a view in plan of a mine shuttle car including motor and brake mechanisms embodying the invention;

Fig. 2 is a view in side elevation of the shuttle car seen in Fig. 1;

Fig. 4 is a view in section, the section being taken on line 4—4 of Fig. 3 and showing details of construction of the brake mechanism; and Fig. 5 is a view of another portion of the operating mechanism for the parking or holding brake.

Figure 3:
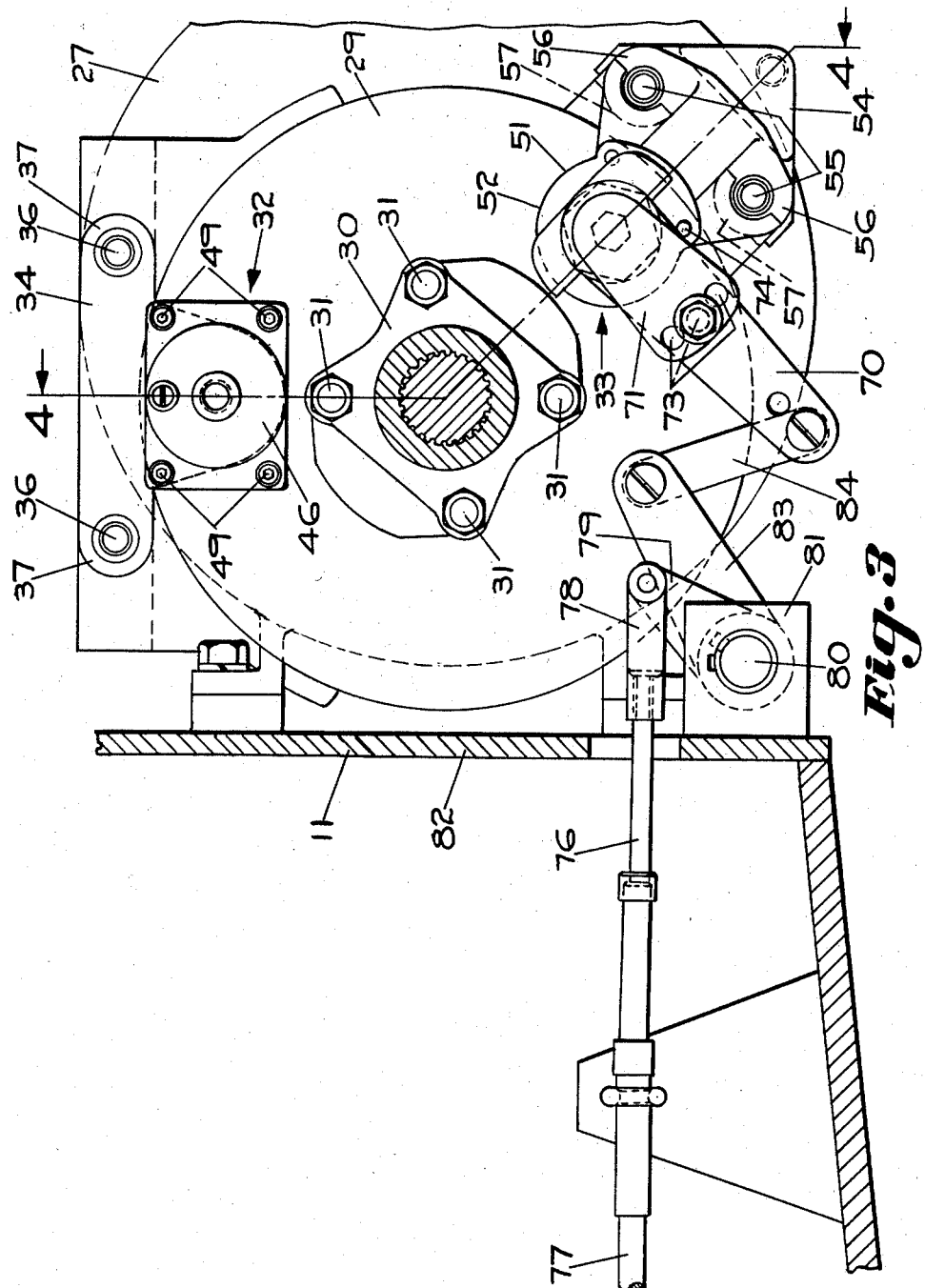
Fig. 3 is a view in section, the section being taken substantially on line 3—3 of Fig. 1 and showing part of a mechanical linkage for operating the parking or holding brake mechanism thereof.

In Figs. 1 and 2 of the drawings there is shown a self-propelled vehicle in the form of a mine shuttle car 10 which includes the invention. Shuttle car 10 has a main frame 11 which includes or forms an integral load carrying body in which coal, as an example, may be transported in a mine. An endless conveyer 12 in the bottom of the body may be employed to aid in loading coal into the body, and this conveyer is operated to convey the coal from the shuttle car 10 at the discharge end 13 of the latter.

Shuttle car 10 is supported by two pairs of steerable traction wheels 14 and 15 that are steered through steering mechanism, not shown, by a steering wheel 16 located between a pair of oppositely facing operator's seats 17 and 18 positioned at an operator's platform or station 19 located at one side and adjacent the discharge end 13 of the body 11. Each pair of traction wheels 14 and 15 is mounted to the body and interconnected by gearing similar to the gearing disclosed in the patent to Arthur L. Lee, No. 2,381,672, dated August 7, 1945, and to which reference is made for a complete understanding of structure hereinafter mentioned but not shown.

The mechanisms which mount and interconnect the pairs of wheels 14 and 15 are identical, but of opposite hand, and each pair of wheels 14 and 15 includes two individual ground engaging traction wheels 20 and 21 carried at one side of housings 22 and 23, respectively. Housings 22 and 23 are mounted at opposite sides of main frame 11 and each contains reduction gearing through which the associated wheel 20 or 21 is driven. In addition to this reduction gearing, housings 22 each also contain a differential to which the gearings are interconnected by drive shafts 24 that extend transversely of the main frame 11 and below the upper or working run of conveyer 12. The differential in each housing 22, and consequently the wheels 20 and 21 of each pair of wheels 14 and 15, is driven in reverse directions through a drive shaft means 25 that extends from the housing 22 toward an end of the main frame 11 to a combination reversible motor and brake unit 26 that is removably mounted upon the main frame 11.

From the description thus far given it is apparent that the pairs of wheels 14 and 15 are driven in reverse directions by separate combination reversible motor and brake units 26, which motor and brake units are positioned at the same side of the main frame 11 and adjacent opposite ends thereof. It is also apparent that the combination motor and brake unit 26 that drives the pair of wheels 14 as well as the drive shaft 25 associated therewith is positioned on the main frame 11 opposite the operator's platform or station 19 and between the wheel 20 and the discharge end 13 of the main frame.

Each combination motor and brake unit 26 includes a reversible electric motor, the housing or main frame of which cooperates to form a housing 27 for a speed reducing gearing, not shown, which interconnects the armature shaft of the motor with the rotary power output shaft of the unit 26. A flanged hub 28 carried upon and rotated by the power output shaft of the unit 26 carries a rotary disc 29 and one element 30 of one of the universal joints of the associated drive shaft 25. Brake disc 29 and element 30 are connected to hub 28 by a plurality of bolts 31.

It is to be noted that in the shuttle car illustrated in the drawings the motor and brake units 26 for the pairs of wheels 14 and 15 each include a service brake 32 and that only the motor and brake unit 26 for the pair of wheels 14 includes a parking brake 33. If desired, the motor and brake units 26 for both pairs of wheels 14 and 15 may be caused to include a parking brake 33, but it has been found in practice that one parking brake 33 has an efficiency such that more than one of them is not required to lock the shuttle car 10 against movement over the ground.

The hydraulically operated service brake 32 includes a block 34 mounted to the main frame of the electric motor through the gear housing 27 thereof by a bracket 35 and a pair of spaced parallel pins or slide bars or rods 36 that extend through aligned openings in ears or lugs 37 in bracket 35 and block 34 and along which block 34 may move or slide in a direction parallel to the axis of rotation of the power output shaft of the motor.

Block 34 carries a friction brake shoe in the form of a disc 38 that seats in a cup in block 34 and is secured therein by a rivet and a pin 39. Brake shoe 38 is positioned at one side of brake disc 29 and is adapted to engage it frictionally when the brake is operated to arrest rotary movement of brake disc 29 and the elements associated with it.

Aligned with the brake shoe 38 and at the opposite side of brake disc 29, block 34 carries a second brake shoe 40, which is similar to brake shoe 38, through a plunger 41 carried in a cylinder 42 formed in the block 34. Rotation of plunger 41 in the cylinder 42 is prevented by a pin 43 that extends from plunger 41 into a slot 44 formed in the block 34. Brake shoe 40 seats in a cup in one end of plunger 41 and is held therein by a center screw and a pin 45. The pin 43 and slot 44, as well as the pins 39 and 45, cooperate to prevent rotation of the brake shoes 38 and 40 with respect to block 34 when service brake 32 is operated.

Plunger 41 is operated or moved in the cylinder 42 along an axis which is parallel with respect to the axis of rotation of disc 29 by a hydraulic motor including a cylinder or cup 46 into which a reduced diameter portion of the plunger 41 extends through suitable dirt seals 47 to abut a piston 48 in the cylinder or cup 46. The cylinder or cup 46 and dirt seals 47 are clamped directly to one side of the block 34 by four cap screws 49 that extend through openings in the base flanges of the cylinder 46 and the dirt seals 47.

It will be seen that when hydraulic fluid under pressure is supplied to the chamber 50 formed by the cylinder 46 and piston 48 from a standard foot pedal operated master cylinder, not shown, that the piston 48 and plunger 41 will be moved until the brake shoe 40 engages the brake disc 29 and that thereafter cylinder 46 and block 34 will be moved along rods 36 until the brake shoe 38 engages brake disc 29, whereupon the brake device 32 will function in the nature of a C-clamp to arrest rotary motion of brake disc 29.

The construction of the mechanically operated parking or holding clamp type brake 33 is to be particularly noted. This structure includes a body, block or yoke 51 having a pair of arms 52 and 53 which straddle and extend, one at each side of brake disc 29. Yoke 51 is carried through a bracket 54 bolted to the main frame of the electric motor through its housing portion 27 and a pair of spaced parallel pins or rods 55 that extend through aligned openings in interfitting lugs or ears 56 and 57 on the yoke 51 and bracket 54, respectively.

Clearance is provided between the ears or lugs 56 and 57, as indicated at 58 in Fig. 4 of the drawings, in order that the body, block or yoke 51 may float, move or slide along the pins or rods 55 in a direction parallel to the axis of rotation of brake disc 29, thereby to follow movement of disc 29 along its axis of rotation.

Arm 53 of yoke 51 includes a threaded opening through which there extends a cam element in the form of a screw 59 that projects from the arm 53 toward the adjacent friction surface or side of disc 29. This projecting end of screw 59 carries a cup 60 in which there is seated a friction brake shoe in the form of a disc 61 adapted to engage frictionally the adjacent side of disc 29 when the brake 33 is operated to hold the disc 29 against rotary motion. Screw 59 may be rotated in arm 53 to adjust the position of brake shoe 61 with respect to disc 29 and arm 53 and it is locked in adjusted position by a plate 62 provided with a hexagonal plug 63 that fits into a correspondingly shaped socket in an end of screw 59. Plate 62 is secured to arm 53 by a cap screw 64 that may be inserted through any of a plurality of openings in the plate and threaded into the arm 53.

The other arm 52 of the body, block or yoke 51 forms a hexagonal socket 65 opening towards the disc 29 that receives a hexagonal nut 66 through which a brake operating cam element in the form of a screw 67 extends. Screw 67 extends through both the nut 66 and arm 52 and projects at each side thereof, and its end adjacent the disc 29 carries a cup 68 and brake shoe 69 similar to cup 60 and shoe 61. The other or outermost end of screw 67 carries an arm or lever 70 that is threaded thereon, and a plate 71 similar to plate 62 having a hexagonal plug 72 that is received in a hexagonal socket in the end of screw 67. Plate 71 may be secured in any of three positions with respect to arm 52 by a cap screw that may be inserted through any one of three holes 73 therein and screwed into arm 70. It will be seen that the brake shoes 61 and 69 may each be adjusted with respect to each other, the disc 29 and the arms 52 and 53, by removing the plates 62 and 71, rotating the screws 59 and 67 as required and by then replacing the plates 62 and 71 to lock the screws 59 and 67 in the adjusted position. Arm 52 carries a pin 74 that limits rotary movement of the screw 67 and arm or lever 70 when they are rotated in a direction to release the brake.

It will be seen that when arm or lever 70 is rotated to apply the brake that brake shoe 69 may first be brought into light frictional engagement with disc 29 and that the body, block or yoke 51 will then be caused to slide on rods or pins 55 until brake shoe 61 engages disc 29, and that thereafter the apparatus will function in the nature of a C-clamp to arrest and/or prevent rotation of the disc 29 and the mechanism associated therewith.

While the mechanically operated brake mechanism 33 may be employed in emergencies to stop rotation of the disc 29 and consequently movement of the shuttle car 10, it is primarily intended to function as a parking or holding brake of the car and normally is applied when the shuttle car is not in motion.

Brake mechanism 33 is operated manually by the shuttle car operator by means of a suitable lever 75 positioned at platform 19, to which a cable 76, which operates in a flexible sheath 77, is connected. Cable 76 and sheath 77 extend transversely across the main frame 11, and cable 76 is conected through a clevis and pin 78 to an arm 79 on one end of a lever 80 which is trunnioned in spaced bearing blocks 81 carried by an upright wall 82 of main frame 11. The body or shaft of lever 80 extends longitudinally of main frame 11 and it is conected through a second lever arm 83 and a pair of links 84 to the lever 70 of brake apparatus 33.

From the foregoing it will be seen that by this invention there is provided a combination motor and brake unit or "package unit" that may readily and with ease be placed upon and removed from any machine that is to be provided with both a motor means and a brake means and that when such machine is a vehicle that the usual brake drums, etc., adjacent the individual wheels, may be dispensed with, thereby resulting in a more compact and a more simple vehicle.

It will also be seen that because the mechanical brake means 33 is operated through the cam or screw means 67 that very great pressure may be applied to the brake shoes to secure the disc 29 against rotation with but very little manual effort on the part of the operator and with very small strain on the operating linkage for the brake. For this reason the operating linkage mechanism for the brake may be of lighter construction than is usually deemed necessary for customary mechanically operated types of brakes.

It will, of course, also be obvious that should the brake disc 29 be mounted upon the rotary power output shaft of the unit 26 for movement along the axis thereof that blocks 34 and 51 of brakes 32 and 33 may be mounted rigidly to the housing 27 through the brackets 35 and 54, respectively.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

What is claimed is:

1. In a brake mechanism having a disc mounted for rotation on an axis, brake means for arresting the rotation of the disc comprising, a yoke slidably supported adjacent the disc having an arm extending to each of the opposite surfaces of the disc, friction means on each of the yoke arms and positioned adjacent the opposite surfaces of the disc, means for moving said friction means into engagement with the opposite surfaces of the disc to arrest the rotation thereof, at least one of said yoke arms including a screw element threaded through the arm and having an end extending towards the disc and carrying one of said friction means, the means for moving the friction means comprising an operating lever threaded on the screw element at the end opposite the friction means, means fixedly engaging the screw element and adjustably secured to the operating lever for adjustment of the position of the screw element and the friction means carried thereby, oscillation of the operating lever advancing the screw element and the friction means into engagement with the disc.

2. In a brake mechanism having a disc mounted for rotation on an axis, brake means for arresting the rotation of the disc comprising a yoke adjacent the disc having an arm extending to each of the opposite surfaces of the disc, friction means on each of the yoke arms and positioned adjacent the opposite surfaces of the disc, means mounting the yoke for sliding movement parallel to the axis of rotation of the disc, means for moving said friction means into engagement with the opposite surfaces of the disc to arrest the rotation thereof, at least one of said yoke arms including a screw element threaded through the arm and having an end extending towards the disc and carrying one of said friction means, the means for moving the friction means comprising an operating lever threaded on the end of the screw element opposite that on which the friction means is carried, a socket formed in said opposite end of the screw element, means including a plug fixedly engaged in the socket and adjustably secured to the operating lever for adjustment of the screw element and the friction means carried thereby, oscillation of the operating lever advancing the screw element and the friction means into engagement with the disc.

3. In a brake mechanism having friction means adapted to engage a moving member to arrest the motion of said member comprising, a socket member disposed adjacent the moving member, a supporting element for the friction means threaded through the socket member with the friction means facing the moving member whereby rotation of the supporting element relative to the socket member advances the supporting element and the friction means carried thereby for engagement with the moving member to arrest the motion thereof, means for rotating and advancing the supporting element comprising a lever threaded on the supporting element, and means fixedly engaging the supporting element and secured to the lever whereby oscillation of the lever advances the supporting element and the friction means.

4. In a brake mechanism having friction means adapted to engage a moving member to arrest the motion of said member comprising, a socket member disposed adjacent the moving member, a supporting element for the friction means threaded through the socket member with the friction means facing the moving member whereby rotation of the supporting element relative to the socket member advances the supporting element and the friction means carried thereby for engagement with the moving member to arrest the motion thereof, means for rotating and advancing the supporting element comprising a lever threaded on the supporting element, a socket in the end of the supporting element, and means fixedly engaged in the socket, the last said means being secured to the lever whereby oscillation of the lever advances the supporting element and the friction means.

5. In a brake mechanism having a movable member, friction means for engaging and bearing against said member to arrest the movement thereof, a screw element extending towards the movable member and supporting the friction means adjacent the movable member, supporting means disposed adjacent the movable member, said screw element being threaded through the supporting means whereby rotation of the screw element relative to the supporting means advances the friction means towards the movable member, an operating lever threaded on the end of the screw element, said end of the screw element being formed with a socket, and means including a plug inserted into the socket fixedly engaged with the screw element, the last said means being adjustably secured to the operating lever whereby the position of the screw element may be adjusted, and oscillation of the operating lever advancing the screw element and the friction means into engagement with the movable member.

6. In a brake mechanism having a movable member, friction means for engaging and bearing against said member to arrest the movement thereof, a screw element extending towards the movable member and supporting the friction means adjacent the movable member, supporting means disposed adjacent the movable member, said screw element being threaded through the supporting means whereby rotation of the screw element relative to the supporting means advances the friction means towards the movable member, an operating lever threaded on the end of the screw element, means fixedly engaged with the screw element and adjustably secured to the operating lever whereby the position of the screw element may be adjusted, and oscillation of the operating lever advancing the screw element and the friction means into engagement with the movable member.

References Cited in the file of this patent

UNITED STATES PATENTS

| 1,711,602 | Kindler | May 7, 1929 |
| 1,875,095 | Milan | Aug. 30, 1932 |
| 1,928,866 | Newhart | Oct. 3, 1933 |
| 2,013,492 | Gorton | Sept. 3, 1935 |
| 2,109,722 | Fawick | Mar. 1, 1935 |
| 2,351,041 | Hawley | June 13, 1944 |
| 2,612,968 | Hood | Oct. 7, 1952 |
| 2,657,772 | Chamberlain | Nov. 3, 1953 |
| 2,711,802 | Davis | June 28, 1955 |

FOREIGN PATENTS

| 638,561 | Great Britain | June 14, 1915 |
| 248,594 | Italy | Apr. 7, 1926 |